(12) United States Patent
Cantwell et al.

(10) Patent No.: US 10,420,319 B2
(45) Date of Patent: Sep. 24, 2019

(54) ANIMAL ENCLOSURE

(71) Applicant: Mid-West Metal Products Co., Inc., Muncie, IN (US)

(72) Inventors: Brad Cantwell, Muncie, IN (US); Michael E. Greene, Muncie, IN (US); Terrance L. Jones, Muncie, IN (US); Stew Kerr, Muncie, IN (US)

(73) Assignee: Mid-West Metal Products Company, Inc., Muncie, IN (US)

( * ) Notice: Subject to any disclaimer, the term of this patent is extended or adjusted under 35 U.S.C. 154(b) by 27 days.

(21) Appl. No.: 15/612,051

(22) Filed: Jun. 2, 2017

(65) Prior Publication Data

US 2017/0268294 A1   Sep. 21, 2017

Related U.S. Application Data

(63) Continuation of application No. 14/039,671, filed on Sep. 27, 2013, now Pat. No. 9,695,636.

(60) Provisional application No. 61/715,400, filed on Oct. 18, 2012.

(51) Int. Cl.
```
A01K 1/03      (2006.01)
A01K 1/02      (2006.01)
E06B 11/02     (2006.01)
A01K 31/08     (2006.01)
```
(52) U.S. Cl.
CPC ............ *A01K 1/0245* (2013.01); *A01K 1/033* (2013.01); *A01K 1/034* (2013.01); *A01K 31/08* (2013.01); *E06B 11/021* (2013.01)

(58) Field of Classification Search
CPC ..... A01K 1/0017; A01K 1/0035; A01K 1/034
USPC ....... 119/452, 472, 473, 474, 481, 498, 499, 119/501, 502, 512, 513, 514, 524
See application file for complete search history.

(56) References Cited

U.S. PATENT DOCUMENTS

| | | |
|---|---|---|
| 710,051 A | 9/1902 | Fullam |
| 3,556,058 A | 1/1971 | Smiler |
| 3,896,766 A | 7/1975 | Martin |
| 4,527,512 A | 7/1985 | Sugiura |

(Continued)

OTHER PUBLICATIONS

Precision Pet Products, Inc.; Wire Crates, Exercise Pens and Accessories; published at least as early as 2007.

(Continued)

*Primary Examiner* — Lisa L Tsang
(74) *Attorney, Agent, or Firm* — Taft Stettinius & Hollister LLP; Stephen F. Rost

(57) ABSTRACT

Door frame assembly that includes a frame that defines an opening therein for allowing access therethrough. The door frame also includes a door pivotably coupled to a first vertical wire of the of the frame for pivoting the door between an open position and a closed position. The door frame further includes a first coupling mechanism and a second coupling mechanism. The first coupling mechanism releasably couples the door to the frame and is formed by a first horizontal wire. The first horizontal wire forms a hooked end protruding outward toward the door and spaced inwardly of the frame to intersect with the opening. The second coupling mechanism releasably couples the door to the frame. The second coupling mechanism includes a portion configured to limit movement of the door relative to the frame until the second portion is pivoted in a direction toward the door.

19 Claims, 8 Drawing Sheets

(56) References Cited

U.S. PATENT DOCUMENTS

| | | | |
|---|---|---|---|
| 4,762,085 | A | 8/1988 | Ondrasik |
| 4,770,127 | A * | 9/1988 | Volk .................... A01K 1/0613 |
| | | | 119/473 |
| D300,377 | S | 3/1989 | Willingham |
| 5,373,810 | A * | 12/1994 | Martin .................... A01K 31/10 |
| | | | 119/459 |
| D357,558 | S | 4/1995 | Johnson |
| 5,511,833 | A | 4/1996 | Tashman et al. |
| 5,549,073 | A | 8/1996 | Askins et al. |
| D384,443 | S | 9/1997 | Olfert |
| D409,802 | S | 5/1999 | Baker et al. |
| 5,943,982 | A | 8/1999 | Askins et al. |
| D427,730 | S | 7/2000 | Powers et al. |
| 6,155,206 | A | 12/2000 | Godshaw |
| 6,189,490 | B1 | 2/2001 | Jerripolsky |
| 6,192,634 | B1 | 2/2001 | Lopez |
| 6,460,486 | B1 | 10/2002 | Powers et al. |
| 6,581,545 | B1 | 6/2003 | Foster |
| 6,681,720 | B1 | 1/2004 | Skurdalsvold et al. |
| 6,832,580 | B2 | 12/2004 | Marchioro |
| 6,883,463 | B2 | 4/2005 | Link |
| 7,703,414 | B2 | 4/2010 | Kanno |
| 7,721,678 | B2 | 5/2010 | Jakubowski et al. |
| 7,805,808 | B2 | 10/2010 | Matteson |
| 7,918,188 | B1 | 4/2011 | Harper |
| D652,998 | S | 1/2012 | Cantwell et al. |
| D652,999 | S | 1/2012 | Jakubowski et al. |
| D653,405 | S | 1/2012 | Cantwell et al. |
| 8,141,517 | B2 | 3/2012 | Shimoda |
| 8,267,048 | B2 | 9/2012 | Flannery et al. |
| D673,737 | S | 1/2013 | Cantwell et al. |
| 8,408,416 | B2 | 4/2013 | Cheng-Lung et al. |
| 2008/0265233 | A1 | 10/2008 | Flannery |
| 2012/0227328 | A1 | 9/2012 | Link |
| 2012/0227675 | A1 | 9/2012 | Link et al. |
| 2014/0033611 | A1 | 2/2014 | Link |
| 2014/0150728 | A1 | 6/2014 | Tamiozzo |

OTHER PUBLICATIONS

Midwest Homes for Pets; Championship Collection; published at least as early as 1992.

Midwest Homes for Pets; product description sheet; published at least as early as 1995.

Dockocil; The First and Only Large Collapsible Plastic Crates; published at least as early as 1995.

GoGo Pet Products Double Door Black Epoxy Folding Wire Crate, 24-Inch; last accessed from http://www.amazon.com/dp/B000J3YE0U/ref+twister_B00B4QL13E?_encoding+UTF8&psc+1 on Sep. 25, 2015; on sale at least by Dec. 19, 2006.

* cited by examiner

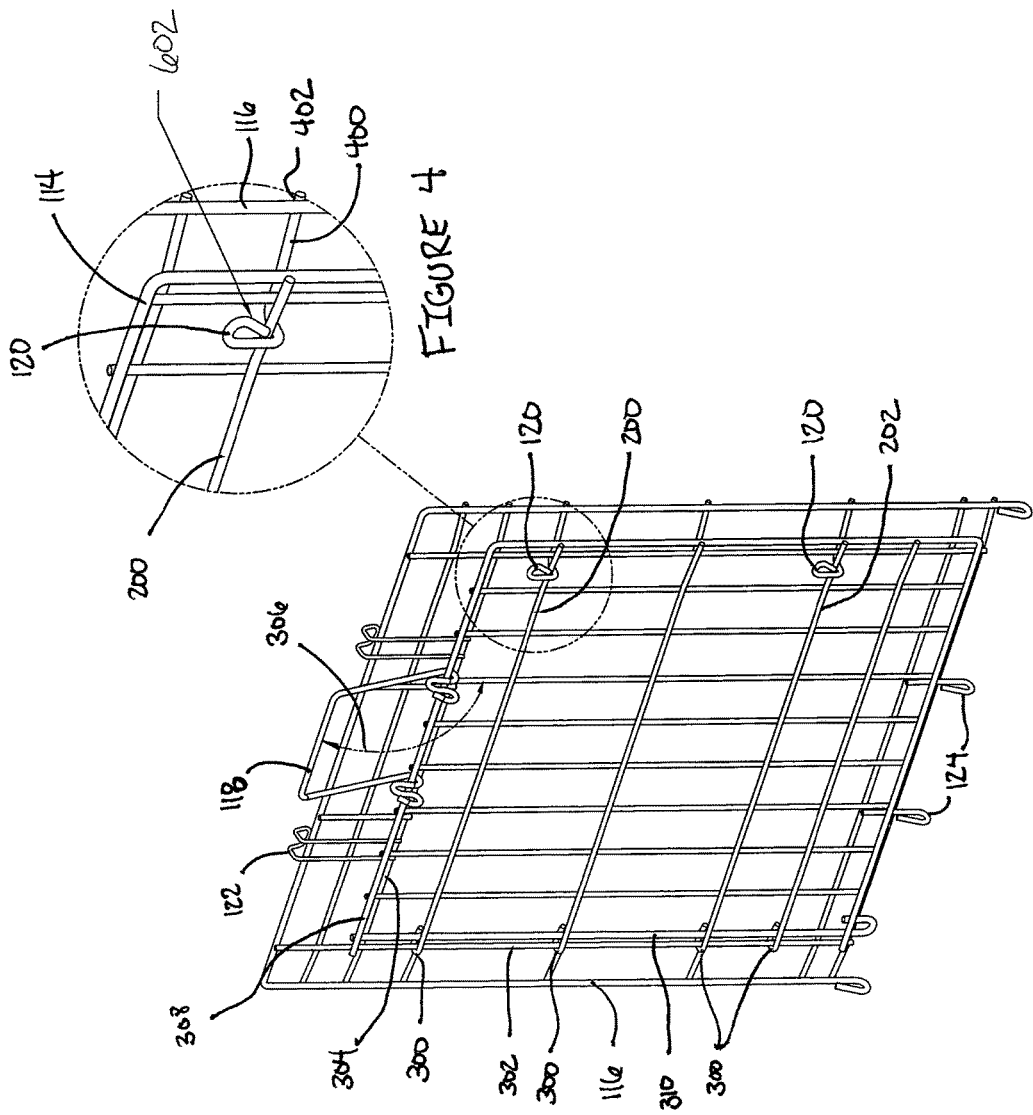

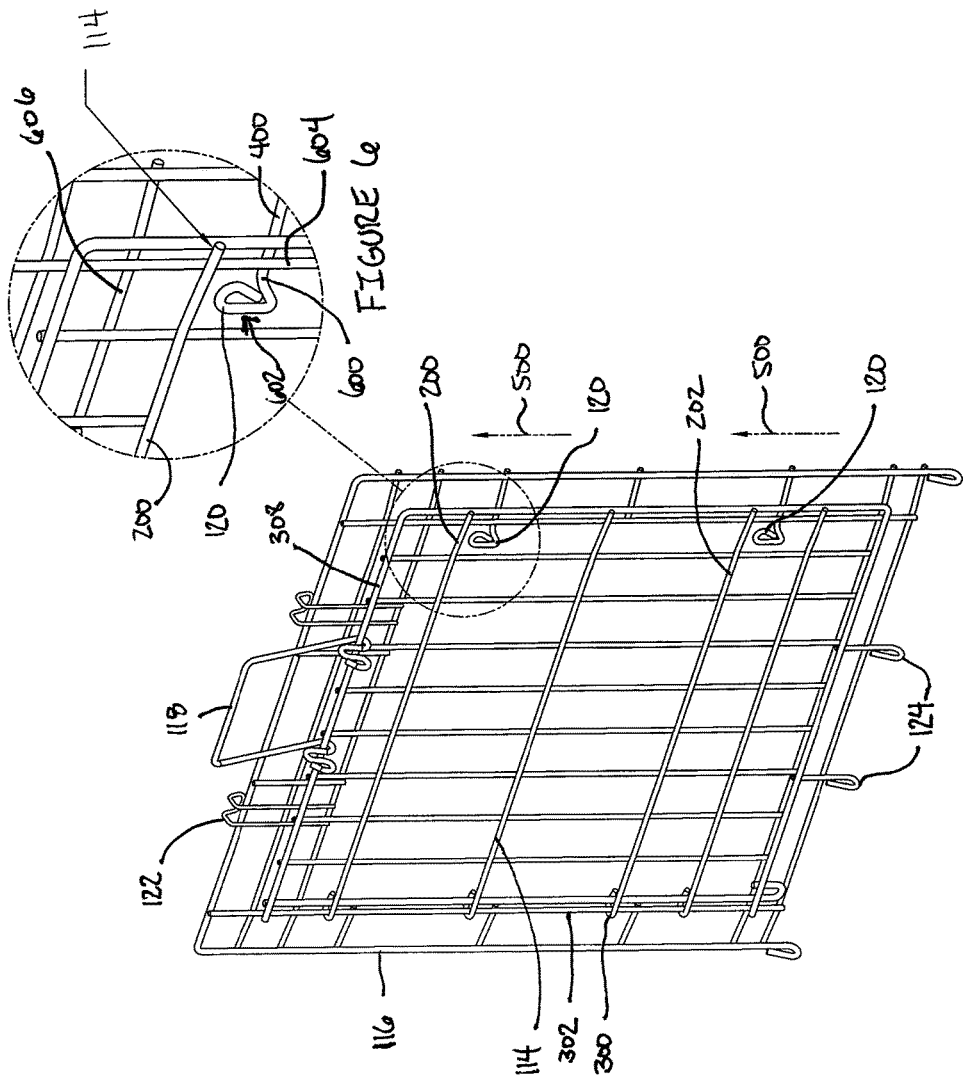

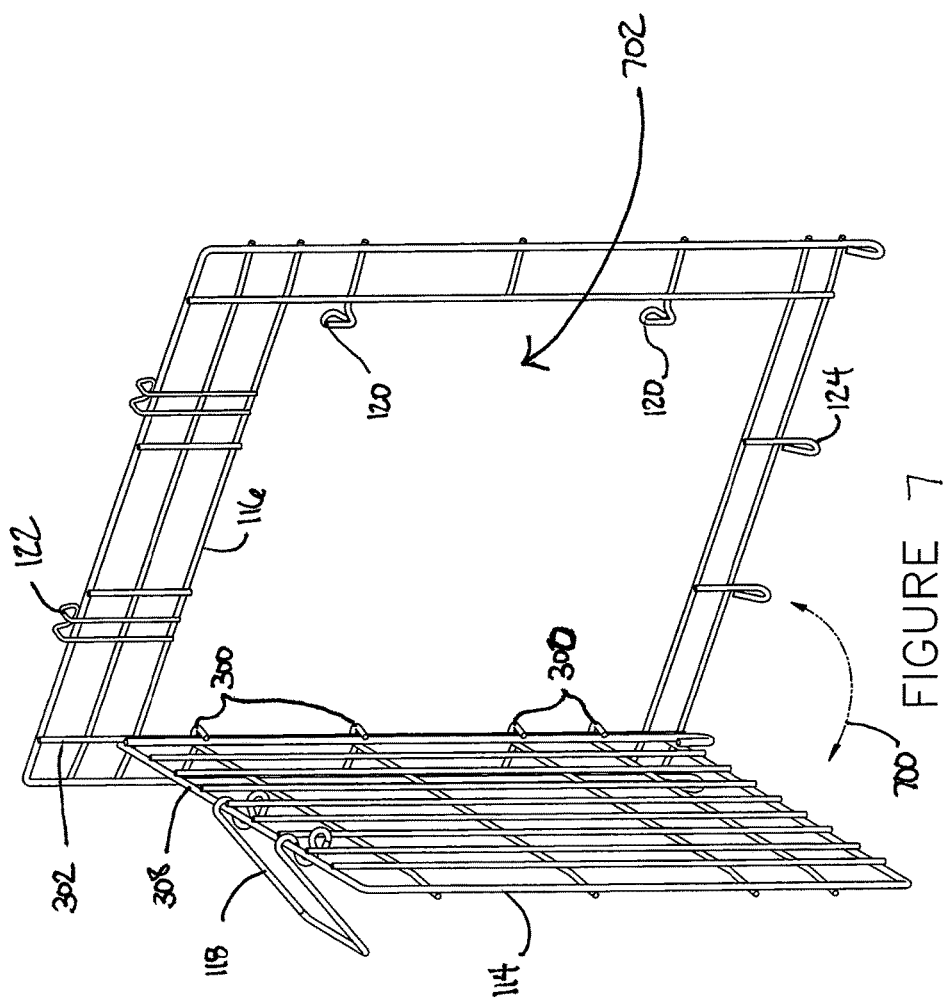

ANIMAL ENCLOSURE

This application is a continuation application of U.S. patent application Ser. No. 14/039,671, filed Sep. 27, 2013, which claims priority to U.S. Provisional Patent Application Ser. No. 61/715,400, filed Oct. 18, 2012, which are hereby incorporated by reference in their entirety.

FIELD OF THE DISCLOSURE

The present disclosure relates to an animal enclosure, and more particularly to an animal enclosure useful for containing and maintaining animals.

BACKGROUND

Animal crates and the like are popular for pet owners to purchase for housing their domestic pet. The cage can allow the pet owner to enjoy their pet while also maintaining the pet in an enclosed and controlled environment. Cages or other similar enclosures can be made from a variety of materials such as plastic, iron, steel, wood, aluminum, woven fabric, etc. The material from which the cage is made can depend on whether the cage is primarily used indoors or outdoors. In any event, pet owners want cages to be durable so that animals enclosed within the cage cannot escape and animals outside the cage cannot enter.

Cages also can include multiple functions in addition to providing a safe enclosure for the pet. For example, the cage can provide a sanitary environment for the pet, and in some instances where more than one pet is contained within the same cage, the cage can include structure for dividing the interior thereof for separating multiple pets. Also, some cages can be easily transportable. Other similar cages can include a handle or other device for transporting the cage.

However, many cages can impose safety and health concerns to animals contained therein. For instance, some wire crates can have wires or latches that tangle with an animal's collar. In other instances, an animal may chew and possibly swallow part of a cage. Moreover, some animals are able to open a cage door and escape from the confinement of the cage.

Therefore, a need exists for an animal enclosure that is safe, secure, and capable of containing an animal without the risk of the animal escaping from containment.

SUMMARY

In a first embodiment, an animal enclosure is provided for containing an animal. The animal enclosure includes a housing defining an interior, the housing including a top, a bottom, a first side, a second side, a third side, and a fourth side, wherein the top, the bottom, the first side, the second side, the third side, and the fourth side each including a plurality of interconnected horizontal and vertical wires; a door frame formed in one of the first side, the second side, the third side, and the fourth side, the door frame including a plurality of interconnected horizontal and vertical wires, wherein the door frame defines an opening therein for allowing access to the interior of the housing; a door pivotally coupled to a first vertical wire of the of the door frame for pivoting the door between an open position and a closed position, the door including a plurality of interconnected horizontal and vertical wires; a first coupling mechanism for releasably coupling the door to the door frame, the first coupling mechanism formed by a first horizontal wire of the door frame, wherein the first horizontal wire forms a hooked end spaced inwardly of the door frame and intersects the opening defined by the door frame; and a second coupling mechanism for releasably coupling the door to the door frame, the second coupling mechanism including a first portion pivotally coupled to the door and a second portion configured to limit movement of the door relative to the door frame without first pivoting the second portion away from the door frame.

In one example, the door frame comprises at least two first coupling mechanisms. In a second example, a horizontal wire of the door is positioned within the hooked end of the first coupling mechanism in the closed position. In a third example, the first horizontal wire includes the hooked end and another end disposed opposite thereof, the first horizontal wire comprising a bend of approximately 90° therebetween. In a fourth example, the second coupling mechanism comprises a substantially U-shaped structure. In a fifth example, the door is movable about a first direction and a second direction when being moved from the position to the open position. In a sixth example, the door frame comprises a plurality of hooks for coupling to the top and bottom. In a seventh example, at least two of the plurality of horizontal wires comprises curled ends that are coupled to a vertical wire of the door to form an opening configured to receive the first vertical wire.

In another embodiment, a method is provided for opening a door of an animal enclosure from a closed position. The method includes providing a door frame, a door pivotally coupled to the door frame, a first coupling mechanism, and a second coupling mechanism including a stopper mechanism; pivoting the second coupling mechanism about a first horizontal wire on the door until the stopper mechanism moves to a position away from and clears the door frame; with the stopper mechanism clear from contacting the door frame, lifting the door until a second horizontal wire of the door clears the first coupling mechanism; and pivoting the door to the open position.

In one example, the method includes lifting the door until a third horizontal wire of the door clears the first coupling mechanism. In a second example, the method includes pivoting the door about a first vertical wire of the door frame. In a third example, the second coupling mechanism comprises a latch formed of a single wire. In a fourth example, the pivoting the second coupling mechanism step is performed before the lifting the door step. In a fifth example, the method includes substantially preventing any lifting movement of the door until the second coupling mechanism is pivoted. In a sixth example, the method includes substantially preventing any lifting movement of the door until the stopper mechanism clears the door frame. In a seventh example, the method includes substantially preventing the pivoting the door step until after the pivoting the second coupling mechanism step and the lifting the door step.

In a different embodiment, a door frame assembly is provided for an animal enclosure. The door frame assembly includes a frame including a plurality of interconnected horizontal and vertical wires that define an opening in the frame for allowing access therethrough; a door pivotally coupled to a first vertical wire of the of the frame for pivoting the door between an open position and a closed position, the door including a plurality of interconnected horizontal and vertical wires; a first coupling mechanism for releasably coupling the door to the frame, the first coupling mechanism formed by a first horizontal wire of the frame, wherein the first horizontal wire forms a hooked end protruding outward toward the door and spaced inwardly of the frame to intersect with the opening defined by the frame; and a second coupling mechanism for releasably coupling the door to the frame, the second coupling mechanism including a first portion pivotally coupled to the door and a second portion configured to limit movement of the door relative to the frame until the second portion is pivoted in a direction toward the door.

In one example, a horizontal wire of the door is coupled to the first coupling mechanism in the closed position. In a second example, the frame comprises at least two first coupling mechanisms spaced vertically from one another. In a third example, in the closed position, a first horizontal wire of the door is positioned within an opening formed by one of the first coupling mechanisms and a second horizontal wire of the door is positioned within an opening formed by another of the first coupling mechanisms.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3 is a perspective view of the frame and door assembly of FIG. 2;

FIG. 4 is an enlarged view of a coupler of the frame of FIG. 3;

FIG. 5 is another perspective view of the frame and door assembly of FIG. 2;

FIG. 6 is an enlarged view of a coupler of the frame of FIG. 5;

FIG. 7 is a perspective view of the frame and door assembly of FIG. 2 with the door in an open position;

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
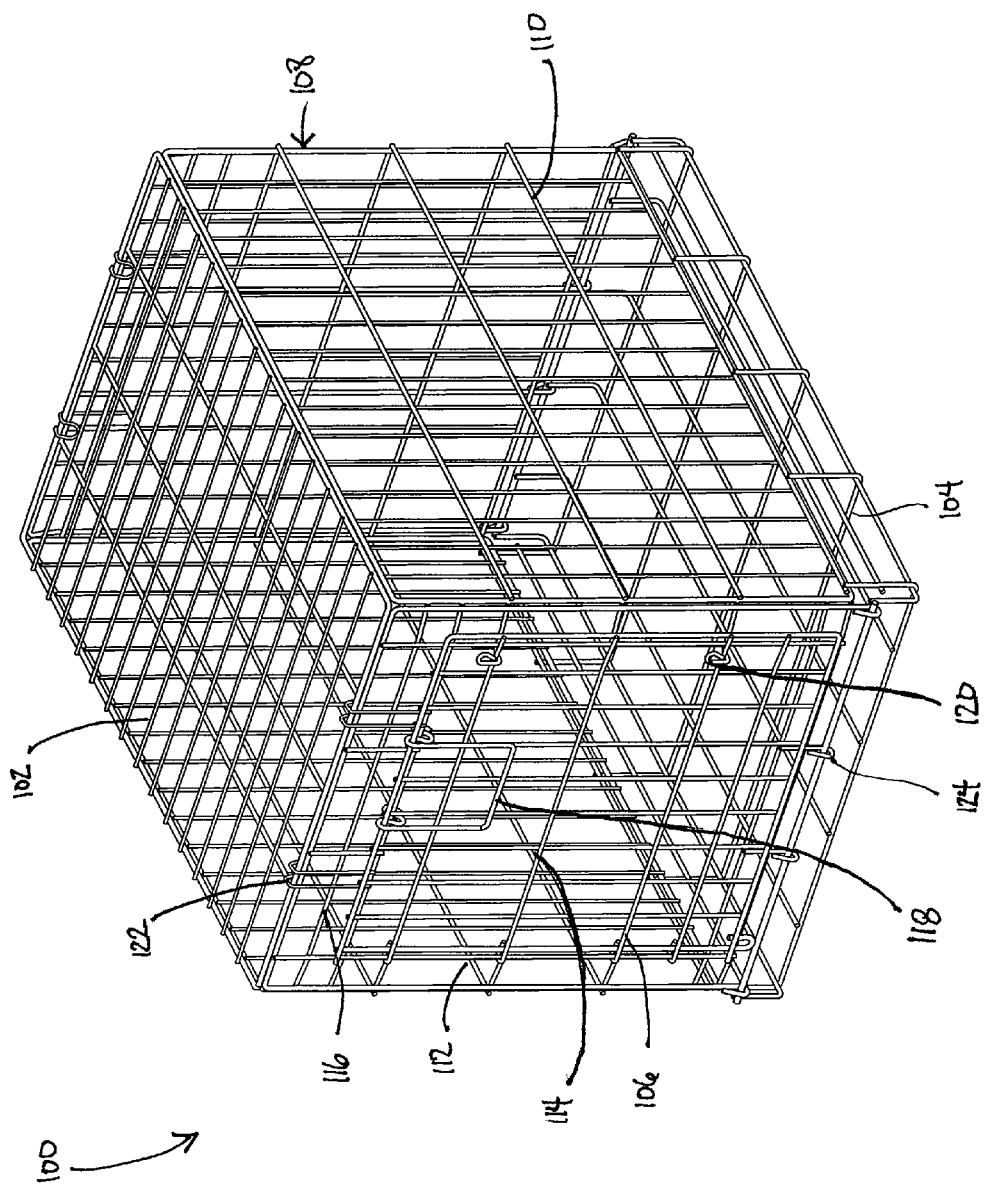
FIG. 1 is a perspective view of an animal enclosure in an upright position.
Figure 10:
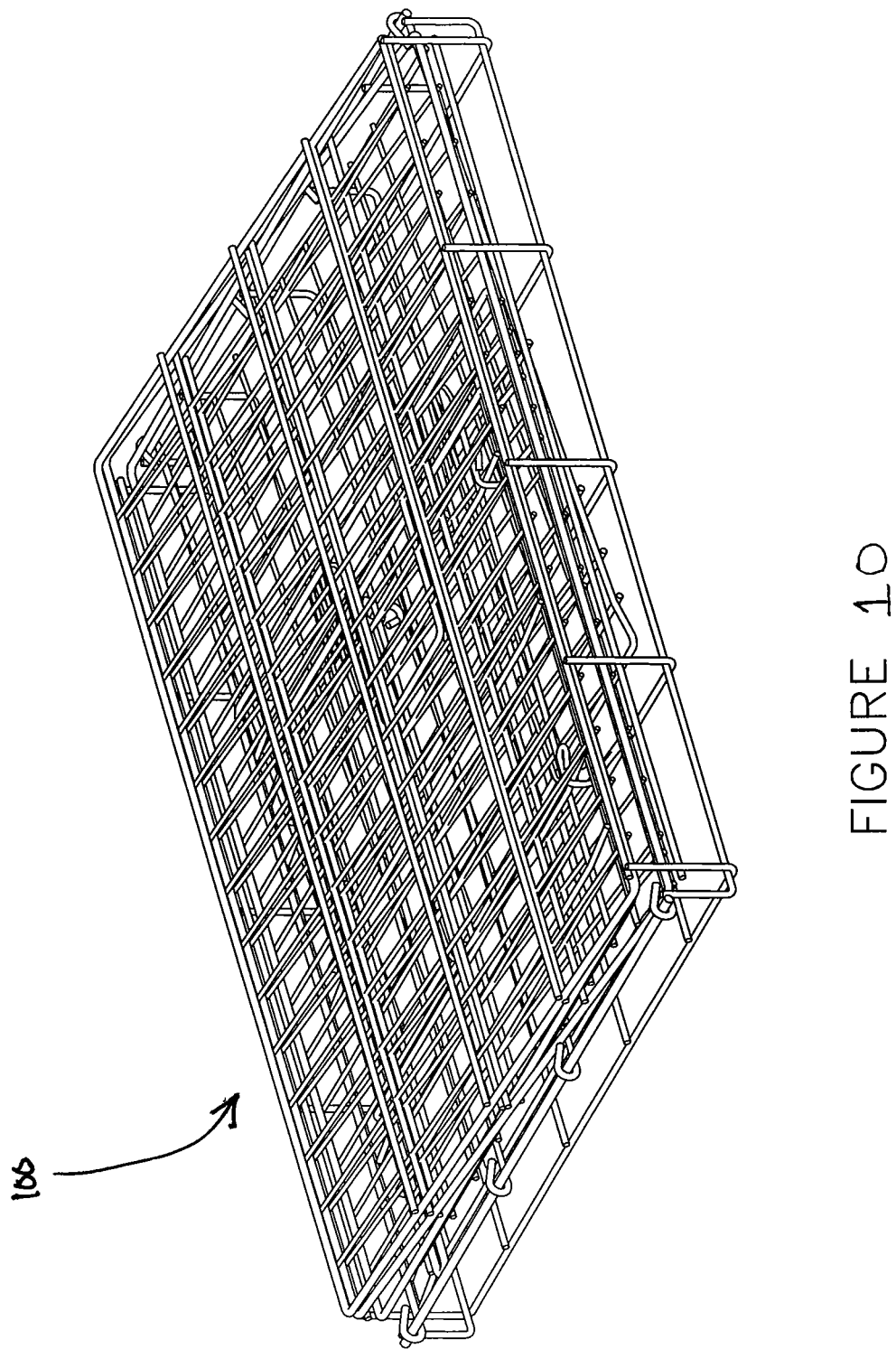
FIG. 10 is a perspective view of the animal enclosure of FIG. 1 in a collapsed position.

An exemplary embodiment of an animal enclosure is shown in FIG. 1. The animal enclosure 100 can be structured to include a top 102, a bottom 104, a front 106, a back 108, a first side 110, and a second side 112. The animal enclosure 100 can be formed of any material, but as shown in the embodiment of FIG. 1, it can be formed of wire material. Each of the top 102, bottom 104, front 106, back 108, first side 110, and second side 112 can be individually coupled to one another to form the enclosure 100. As such, each piece can be removably coupled so that the enclosure 100 can be collapsed for storage (see FIG. 10) and assembled quickly for containing an animal. Alternatively, the top 102, bottom 104, first side 110, and second 112 may form a single piece where the first side 110 and second side 112 are pivotally coupled to both the top 102 and bottom 104, respectively. In this arrangement, the front 106 and back 108 may be decoupled from either the top 102 or bottom 104 and then folded inwardly on top of at least one of the top 102, bottom 104, first side 110, and second side 112. This will be further explained in detail below.

In a different embodiment, the enclosure 100 may not be collapsible such that the enclosure 100 is always in an upright position. For instance, the top 102 may be affixed to the first side 110 and second side 112 to prevent collapsing the enclosure. Likewise, the bottom 104 may be affixed to the first side 110 and second side 112.

Figure 2:
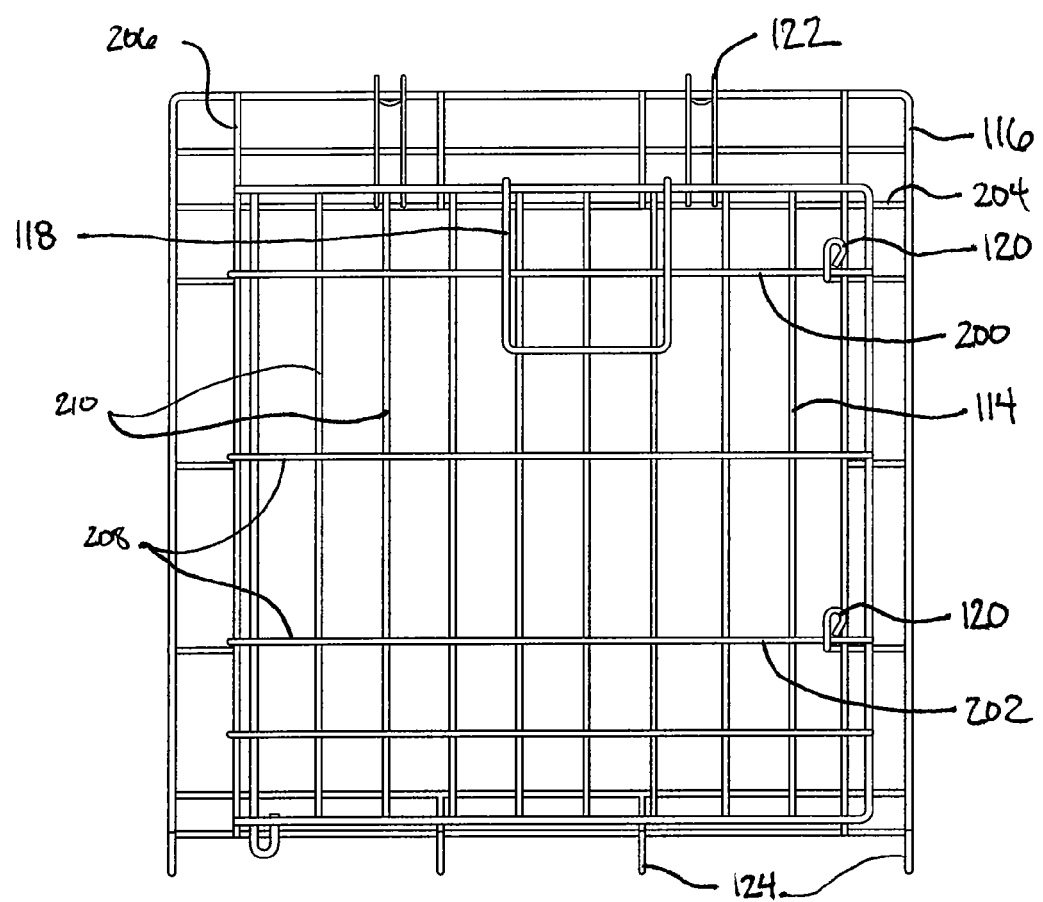
FIG. 2 is a front view of an exemplary embodiment of a frame and door assembly for the animal enclosure of FIG. 1.

Referring to FIGS. 1 and 2, the front 106 can include a front frame and door assembly. The assembly, for example, includes a door 114 pivotably coupled to an outer frame 116. The door 114 and frame 116 can be formed of metal wire, similar to the rest of the enclosure 100, although in other embodiments it may be desirable to form either of a different material. In FIG. 2, however, the door 114 can include a plurality of horizontal wires 208 and vertical wires 210 and the frame 116 can include a plurality of horizontal wires 204 and vertical wires 206.

A door latch 118 can be pivotably coupled to the door 114. The latch 118 can include structure that defines a stopper mechanism that engages the frame 116 to prevent the door 114 from opening. This will be described in greater detail with respect to FIGS. 3-7.

The frame 116 can include one or more upper hook members 122 that engage a wire on the top 102. Likewise, the frame 116 can include one or more lower hook members 124 that engage a wire on the bottom 104. As such, in an upright orientation, the frame 116 is coupled to the top 102 and bottom 104 and disposed substantially perpendicular to both the top 102 and bottom 104. Moreover, the frame 116 is disposed substantially parallel to the back 108. In the embodiment of FIG. 2, there is no corresponding hook member for engaging the first side 110 and/or second side 112. In a different embodiment, however, there can be corresponding hook members for coupling the frame 116 to the first side 110 or second side 112.

The frame 116 can also include one or more couplers 120 disposed at one end thereof. In particular, the one or more couplers 120 is disposed at the end opposite where the door 114 is pivotably coupled to the frame 116. The couplers 120 are disposed outwardly from the frame 116 so that an animal collar does not get tangled or caught on one of the couplers 120. Each coupler 120 can form a hook or loop for engaging with a horizontal wire on the door 114. In addition, when the door 114 is opened, access to the interior of the animal enclosure 100 is available through a defined opening 702 (see FIG. 7). The size of the opening 702 is defined by the frame 116. In the present disclosure, each of the couplers 120 can extend inward of the frame 116 such that the couplers protrude into the opening 702. This is further described below.

The couplers 120, in combination with the latch 118, provide a means for coupling or maintaining the door 114 is a closed position relative to the frame 116. Moreover, to unlatch or unlock the door 114 relative to the frame 116 can require disengaging the latch 118 from the frame 116 and the door 114 from the couplers 120. This is best illustrated in FIGS. 3-7.

Referring to FIG. 3, the door 114 can include a first wire 200 and a second wire 202. The first wire 200 and second wire 202 are substantially parallel to and vertically spaced from one another. Each can be disposed horizontally from one end to an opposite end of the door 114. The first wire 200 can engage an uppermost coupler 120, whereas the second wire 202 can engage a lowermost coupler 120 as shown in FIG. 3. The first wire 200 and second wire 202 are engaged with the couplers 120 when the door 114 is configured in a closed position.

To allow access to the interior of the enclosure 100, the door 114 can be opened. For instance, each of the substantially horizontally-disposed wires (e.g., 200, 202) can include curled or hooked ends 300. The curled or hooked ends 300 are disposed at an end opposite the couplers 120 so that the door 114 can pivot with respect to a substantially vertically-disposed wire 302 of the frame 116. In other words, the wire 302 can pass through each of the curled or hooked ends 300 of the door 114 to permit the door 114 to pivot between an open and closed position with respect to the frame 116. In addition, to maintain the pivotal coupling of the door 114 to the frame 116, the door 114 can include a first vertical wire 310 that is positioned adjacent to the vertical wire 302 of the frame 116. The curled or hooked ends 300 of each horizontal wire can be coupled to the first vertical wire 310. Alternatively, the curled or hooked ends 300 can be bent such that the end of the wire that forms the curled or hooked ends 300 can be in contact or in near contact with the first vertical wire 310. As such, the curled or hooked ends 300 form an opening through which the vertical wire 302 of the frame 116 can fit and the pivot connection is established.

In the illustrated embodiment, however, simply disengaging the first wire 200 and second wire 202 from the couplers 120 does not allow the door 114 to be disengaged from the frame 116. To disengage the wires from the couplers, the door 114 is lifted with respect to the frame 116. However, the door latch 118 is structured as a second coupling mechanism for coupling the door 114 to the frame 116 such that the door latch 118 can prevent the door 114 from being opened.

Figure 8:
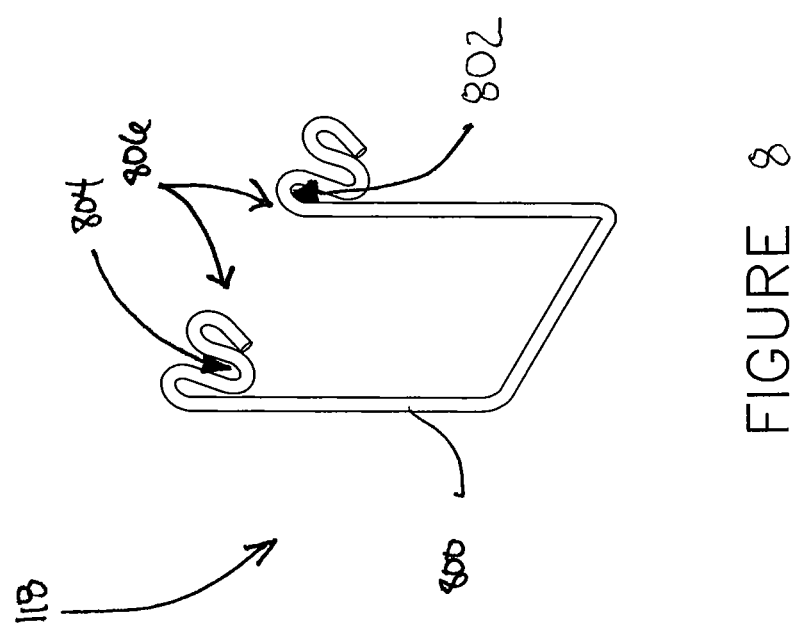
FIG. 8 is a perspective view of a door latch.

In FIG. 8, for example, an exemplary embodiment of the door latch 118 is illustrated. Here, the door latch 118 is in the form of a substantially U-shaped wire 800. The U-shaped wire 800 can be a single wire or a plurality of wires coupled to one another. Moreover, the shape of the wire 800 is in the form of a handle so that a user can disengage the door 114 from the frame 116 by using only one hand. At both ends of the wire 800, the latch 118 includes a coupling mechanism 806. In particular, the wire 800 can be bent in such a way as to define a pivot portion 802 and a stopper portion 804. In FIG. 3, for example, the pivot portion 802 of the latch 118 is pivotally coupled to a substantially horizontal wire 308 of the door 114. This allows the latch 118 to pivot freely with respect to the door 114. In addition, the stopper portion 804 defines an opening or slot that can engage a horizontally-disposed wire 304 on the frame 116. Thus, if the latch 118 is in a downward orientation (e.g., in FIGS. 1 and 2), the door 114 cannot be lifted to disengage the first wire 200 and second wire 202 from the couplers 120 due to the stopper portion 804 engaging the wire 304. In this embodiment, interference between the latch 118 and frame 116 is removed before the door is disengaged from the couplers 120.

In FIG. 3, potential interference between the latch 118 and frame 116 can be removed or avoided by pivoting the latch 118 along a direction indicated by arrow 306. In doing so, the coupling mechanism 806, and in particular the stopper portion 804, is rotated away from the frame 116. In one aspect, the latch 118 can be pivoted nearly 180°. In another aspect, the latch 118 can be pivoted at least 180°. As the latch 118 is pivoted nearly 180°, it can be raised to then disengage the first wire 200 and second wire 202 from the couplers 120. This is best shown in FIGS. 4-6.

Referring to FIG. 4, for instance, the coupler 120 can form a single wire 400 of the frame. One end 402 of the wire 400 can be affixed to the frame 116. For instance, the end 402 can be welded or adhered to the frame 116. A portion of the wire 400 spaced from the end 402 can include an approximately 90° bend 600 such that the wire 400 protrudes toward the door 114 (see FIG. 6). The wire 400 can include a curled or hooked end 602 which is opposite from the end 402 of the wire 400. The curled or hooked end 602 forms the coupling function of the coupler 120.

In the illustrated embodiment, the curled or hooked end 602 not only protrudes outward from the frame 116, but it also protrudes inwardly and intersects the access opening 702 of the enclosure 100. In other words, the frame 116 can include a horizontal wire 606 that defines the top edge of the access opening 702 and a vertical wire 604 that defines a right edge of the opening 702 (see FIG. 6). The wire 400, and in particular the curled or hooked end 602, can protrude into the access opening 702 such that it is positioned to the left of the vertical wire 604 and below the horizontal wire 606. The position of the curled or hooked end 602, however, can be spaced from the vertical wire 604 and horizontal wire 606 by a small distance such that an animal entering or exiting the enclosure 100 is unaffected by the location of the ends 602.

Referring to FIGS. 5 and 6, once the door latch 118 is pivoted about direction 306, the latch 118 or door 114 can be moved along a direction indicated by arrow 500. In this manner, the curled or hooked ends 300 of the horizontally-disposed wires of the door 114 can slide or move relative to the vertically-disposed wire 302 of the frame 116. Once the first wire 200 and second wire 202 clear each of the couplers 120, the door 114 can be pivoted or moved along a direction indicated by arrow 700 in FIG. 7 to an open position. In doing so, the curled or hooked ends 300 can pivot or rotate about wire 302 of the frame. Once the door 114 is opened, access through an opening 702 defined in the frame 116 is available.

Although only the front 106 of the enclosure is shown in FIG. 1 as including a frame and door assembly, it is possible to include additional frame and door assemblies in the back 108, first side 110, and/or second side 112. For example, the enclosure 100 may include a frame and door assembly in the front 106 and first side 110. The size of the door 114 can be the same regardless of whether it is formed in the front 106, back 108, first side 110 or second side 112. Alternatively, the size of the door 114 can be proportional to the side it is formed in. For instance, if the enclosure is shaped as a rectangle, the enclosure may include both a smaller and larger sized doors. In a different embodiment, it is also possible to include a frame and door assembly in the top 102 of the enclosure 100. This allows access through the top of the enclosure 100 and may be advantageous depending on the type and size of animal being contained.

Although not shown, it is also possible to include a divider panel coupled to one or more of the top 102, bottom 104, front 106, back 108, first side 110 and second side 112 so that several animals may be contained in the enclosure 100. An example of a divider panel is illustrated in U.S. Design Pat. No. D668,397, entitled "Divider Panel for an Animal Cage", which is hereby incorporated by reference in its entirety.

Figure 9:
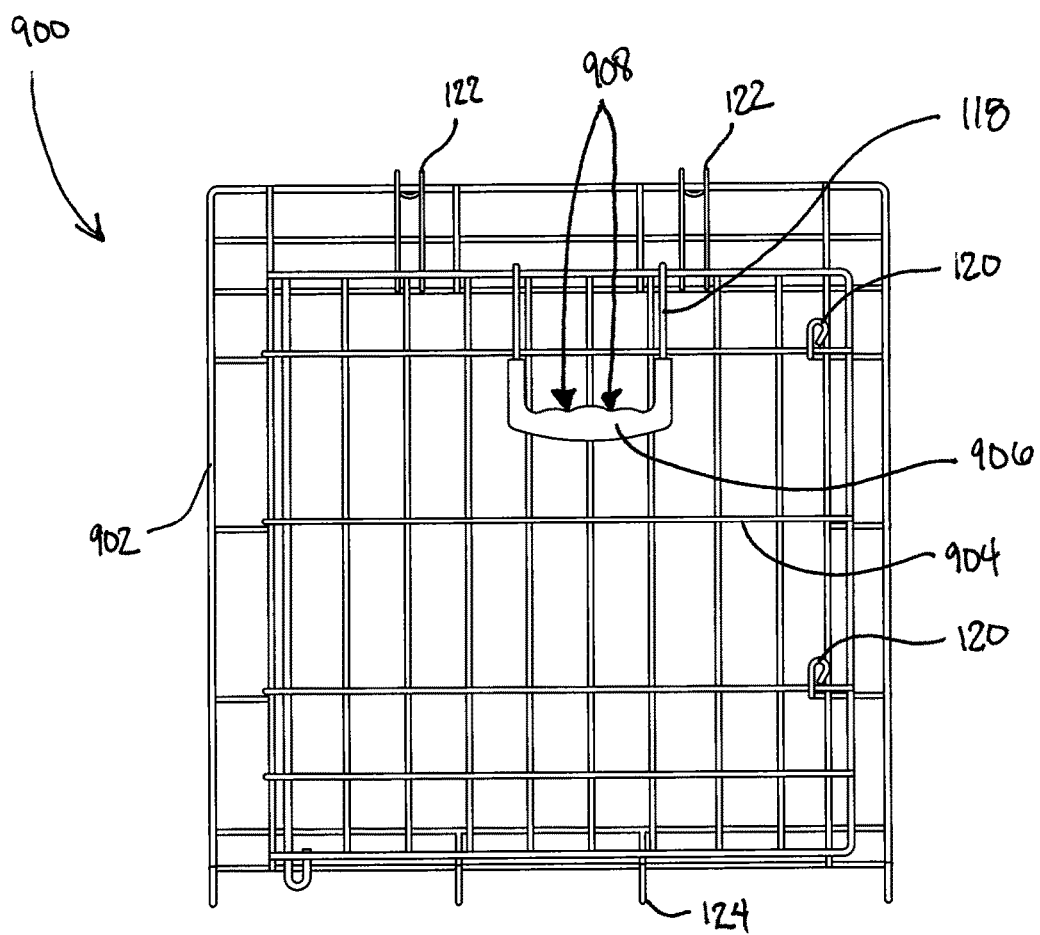
FIG. 9 is a front view of a different embodiment of a frame and door assembly for the animal enclosure of FIG. 1.

Referring to FIG. 9, another embodiment of a frame and door assembly 900 is shown. The assembly 900 includes an outer frame 902 similar to the frame 116 of FIG. 1. A door 904 is pivotally coupled to the frame 902 in a manner similar to the one described above. The door 904 can include a door latch 118 as shown. The door latch 118, however, can include a grip portion 906. The grip portion 906 can be made of a plastic or rubber material. In addition, the grip portion 906 can include one or more indentations or grooves 908 to facilitate a more ergonomically and aesthetically-pleasing handle.

In a further embodiment, the couplers 120 can be formed from wires on the door 114 rather than as the wire 400 on the frame 116. In this embodiment, the frame 116 includes the first wire 200 and second wire 202 for engaging the couplers 120 on the door 114. In this embodiment, the couplers 120 can be oriented either upward or downward such that the door 114 can be moved either upward or downward depending on the orientation of the couplers 120. Once the door 114 is moved to disengage the couplers 120 from the first and second wires, the door 114 can be pivoted to the open position. The manner in which the couplers 120 are oriented is not dependent on the manner in which the door latch 118 engages the frame 116, so the latch 118 can first be pivoted about wire 308 before the couplers 120 are disengaged from the wires 200, 202.

In a different embodiment, the frame and door assembly of the present disclosure can be incorporated into an exercise pen-style enclosure. The exercise pen enclosure may not include a top 102 or bottom 104, and may include a plurality of sides. At least one of the plurality of sides may include the frame and door assembly such that the advantages of the door latch 118 and couplers 120 is provided in an exercise pen enclosure.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An animal enclosure for containing an animal, comprising:
 a housing defining an interior, the housing including a top, a bottom, a first side, a second side, a third side, and a fourth side, wherein the top, the bottom, the first side, the second side, the third side, and the fourth side each include a plurality of interconnected horizontal and vertical wires;
 a door frame formed in one of the first side, the second side, the third side, and the fourth side, the door frame including a plurality of interconnected horizontal and vertical wires defining an outer perimeter and defining an opening having an inner perimeter for allowing access to the interior of the housing, the outer perimeter being larger than the inner perimeter, wherein the plurality of interconnected horizontal and vertical wires of the door frame further defines a first plane and includes an inner horizontal wire of the plurality of interconnected horizontal and vertical wires that define a top portion of the inner perimeter;
 a door pivotably and slidably coupled to a first vertical wire of the plurality of interconnected horizontal and vertical wires of the door frame, the first vertical wire of the door frame configured to enable pivoting of the door between an open position and a closed position and configured to enable sliding of the door along the vertical wire of the door frame, the door formed by a plurality of interconnected horizontal and vertical wires defining a second plane aligned in parallel with the first plane when the door is in the closed position, wherein the second plane of the door is offset from the first plane of the door frame when the door is in the closed position;
 a plurality of coupling mechanisms for releasably coupling the door to the door frame, each of the plurality of coupling mechanisms formed by a different horizontal wire of the plurality of interconnected horizontal and vertical wires of the door frame, wherein one or more different horizontal wires of the plurality of interconnected horizontal and vertical wires of the door frame form a hooked end of each of the coupling mechanisms that is spaced inwardly of the door frame and intersecting the opening defined by the door frame; and
 a latching mechanism for releasably coupling the door to the door frame, the latching mechanism pivotably coupled to an outer horizontal wire of the plurality of interconnected horizontal and vertical wires of the door to allow the latching mechanism to pivot between a latched position and an unlatched position, the outer horizontal wire partially defining the outer perimeter of the door, wherein the inner horizontal wire of the door frame is lower than the outer horizontal wire of the door when the door is in the closed position;
 wherein the latching mechanism comprises a blocking portion configured to limit movement of the door relative to the door frame in the latched position.

2. The animal enclosure of claim 1, wherein the blocking portion is pivoted away from the door in the unlatched position to allow the door to move from the closed position to the open position.

3. The animal enclosure of claim 1, wherein each of the plurality of horizontal wires of the door is positioned within the hooked end of at least one of the plurality of coupling mechanisms in the closed position.

4. The animal enclosure of claim 1, wherein a horizontal wire of the plurality of interconnected horizontal and vertical wires of the door is positioned within the hooked end of a first of the plurality of coupling mechanisms in the closed position.

5. The animal enclosure of claim 4, wherein a second horizontal wire of the plurality of interconnected horizontal and vertical wires of the door is positioned within the hooked end of a second of the plurality of coupling mechanisms in the closed position.

6. The animal enclosure of claim 4, wherein the horizontal wire of the door is positioned outside of the hooked end of the first of the plurality of coupling mechanisms when the door is slid along the first vertical wire of the door frame in a first direction.

7. The animal enclosure of claim 1, wherein the latching mechanism comprises a U-shaped structure.

8. The animal enclosure of claim 1, wherein the door is slidable along the first vertical wire of the door frame in a first direction and pivotable about the first vertical wire in a second direction when being moved from the closed position to the open position.

9. The animal enclosure of claim 8, wherein the door is pivotable about the first vertical wire of the door frame in a third direction and slidable about the first vertical wire in a fourth direction when being moved from the open position to the closed position, wherein the third direction is opposite the second direction, and the fourth direction is opposite the first direction.

10. An animal enclosure for containing an animal, comprising:
a housing defining an interior, the housing including sides;
a door frame formed in one of the sides, the door frame including a plurality of interconnected horizontal and vertical wires defining an outer perimeter and defining an opening having an inner perimeter for allowing access to the interior of the housing, the outer perimeter being larger than the inner perimeter, wherein the plurality of interconnected horizontal and vertical wires of the door frame further defines a first plane;
a door pivotably and slidably coupled to a first vertical wire of the plurality of interconnected horizontal and vertical wires of the door frame, the first vertical wire of the door frame configured to enable pivoting of the door between an open position and a closed position and configured to enable sliding of the door along the first vertical wire of the door frame, the door formed by a plurality of interconnected horizontal and vertical wires defining a second plane aligned in parallel with the first plane when the door is in the closed position, wherein the second plane of the door is offset from the first plane of the door frame when the door is in the closed position to enable the sliding of the door along the first vertical wire of the door frame to move the door from the closed position to the open position;
a plurality of coupling mechanisms for releasably coupling the door to the door frame, each of the plurality of coupling mechanisms formed by a different horizontal wire of the plurality of interconnected horizontal and vertical wires of the door frame, wherein one or more different horizontal wires of the plurality of interconnected horizontal and vertical wires of the door frame form a hooked end of the coupling mechanism that is spaced inwardly of the door frame and intersecting the opening defined by the door frame; and
a latching mechanism for releasably coupling the door to the door frame, the latching mechanism pivotably coupled to an outer horizontal wire of the plurality of interconnected horizontal and vertical wires of the door to allow the latching mechanism to pivot between a latched position and an unlatched position, the outer horizontal wire partially defining the outer perimeter of the door;
wherein the latching mechanism comprises a blocking portion configured to limit movement of the door relative to the door frame in the latched position.

11. The animal enclosure of claim 10, wherein the blocking portion is pivoted away from the door in the unlatched position to allow the door to move from the closed position to the open position.

12. The animal enclosure of claim 10, wherein each of the plurality of horizontal wires of the door is positioned within the hooked end of at least one of the plurality of coupling mechanisms in the closed position.

13. The animal enclosure of claim 10, wherein a horizontal wire of the plurality of interconnected horizontal and vertical wires of the door is positioned within the hooked end of a first of the plurality of coupling mechanisms in the closed position.

14. The animal enclosure of claim 13, wherein a second horizontal wire of the plurality of interconnected horizontal and vertical wires of the door is positioned within the hooked end of a second of the plurality of coupling mechanisms in the closed position.

15. The animal enclosure of claim 13, wherein the horizontal wire of the door is positioned outside of the hooked end of the first of the plurality of coupling mechanisms when the door is slid along the first vertical wire of the door frame in a first direction.

16. The animal enclosure of claim 10, wherein the latching mechanism comprises a U-shaped structure.

17. The animal enclosure of claim 10, wherein the door is slidable along the first vertical wire of the door frame in a first direction and pivotable about the first vertical wire in a second direction when being moved from the closed position to the open position.

18. The animal enclosure of claim 17, wherein the door is pivotable about the first vertical wire of the door frame in a third direction and slidable about the first vertical wire in a fourth direction when being moved from the open position to the closed position, wherein the third direction is opposite the second direction, and the fourth direction is opposite the first direction.

19. The animal enclosure of claim 10 wherein the door frame further includes an inner horizontal wire of the plurality of interconnected horizontal and vertical wires that defines a top portion of the inner perimeter of the opening, and wherein the inner horizontal wire of the door frame is lower than the outer horizontal wire of the door when the door is in the closed position.

* * * * *